Figure 5:
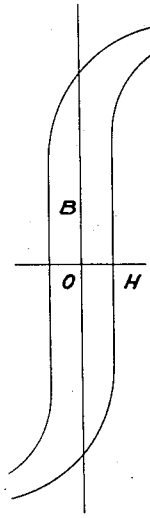
Figure 6:
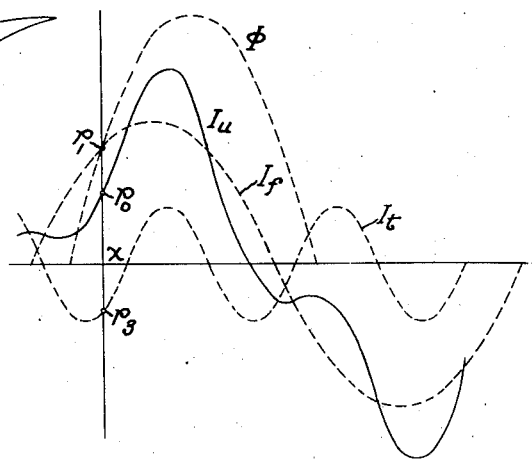
Figure 7:
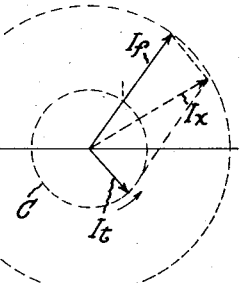

W. O. DWYER.
STATIONARY INDUCTION APPARATUS.
APPLICATION FILED JAN. 26, 1921.
1,412,782.
Patented Apr. 11, 1922.
2 SHEETS—SHEET 1.
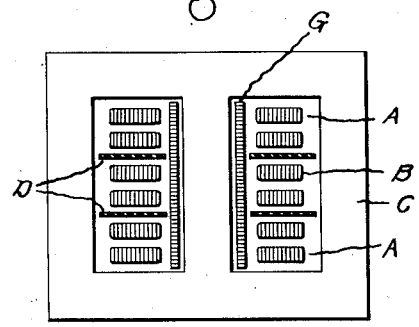
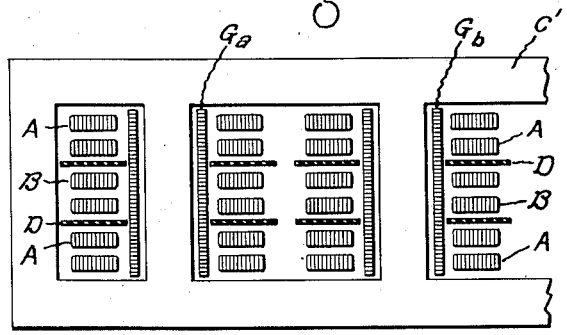
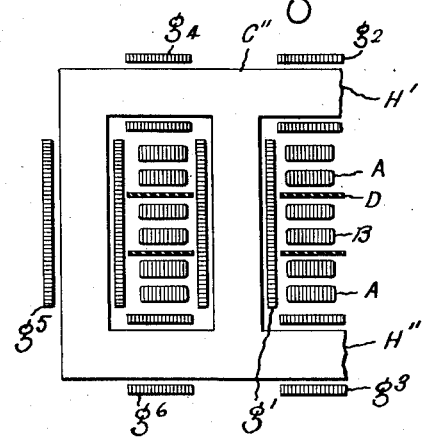
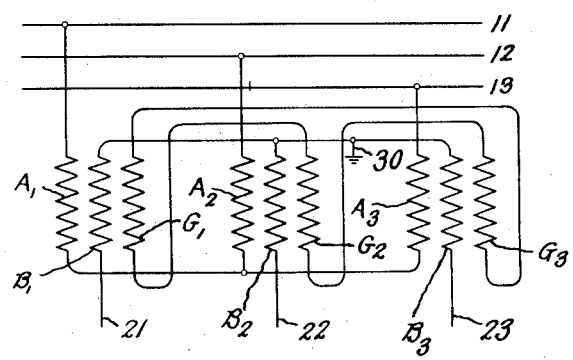
Inventor:
William O. Dwyer,
by Albert G. Davis
His Attorney.

W. O. DWYER.
STATIONARY INDUCTION APPARATUS.
APPLICATION FILED JAN. 26, 1921.

Patented Apr. 11, 1922.

Inventor:
William O. Dwyer,
by *Adam G. Davis*
His Attorney.

UNITED STATES PATENT OFFICE.

WILLIAM O. DWYER, OF PITTSFIELD, MASSACHUSETTS, ASSIGNOR TO GENERAL ELECTRIC COMPANY, A CORPORATION OF NEW YORK.

STATIONARY INDUCTION APPARATUS.

1,412,782. Specification of Letters Patent. Patented Apr. 11, 1922.

Application filed January 26, 1921. Serial No. 440,201.

To all whom it may concern:

Be it known that I, WILLIAM O. DWYER, a subject of the King of Great Britain, residing at Pittsfield, in the county of Berkshire, State of Massachusetts, have invented certain new and useful Improvements in Stationary Induction Apparatus, of which the following is a specification.

My invention relates to stationary induction apparatus, and particularly to apparatus adapted for polyphase operation.

The main object of my invention is to provide an improved arrangement of parts designed for the suppression of objectionable harmonic disturbances.

A further object of my invention is to provide means for neutralizing the harmonic component of the magnetomotive force which tends to produce the objectionable harmonic disturbances.

In electrical apparatus connected for three phase operation such as single phase transformers connected for three phase and in three phase transformers, shell type in particular, it has long been known that the unsymmetrical magnetizing current, whose distortion is caused by the hysteresis effect accompanying the magnetomotive force when varying so as to produce a sinusoidal magnetic flux, is composed of a fundamental and harmonics, the chief of which is the third harmonic or the one whose frequency is three times that of the fundamental. When the cores of such apparatus are operated at relatively high magnetic densities these harmonics have appreciable magnitude. In consequence the windings of such apparatus, whether connected in delta, sometimes styled "in mesh", or in Y, will have their separate parts at every instant threaded by an appreciable magnetic flux component flowing in response to the third harmonic component of the magnetizing current which is always in the same relative direction for each winding. If there is a closed mesh or delta formed by these windings, it is subjected in its several parts to E. M. F.'s in phase, which cause a short-circuited current to flow therein with a frequency three times that of the fundamental; which current may have disturbing effects upon adjacent conductors and generally produces losses and overheating in the apparatus.

When the windings are Y-connected this third harmonic current of course cannot flow, but the harmonic component of the magnetomotive force generates voltages of triple frequency which may cause the voltage to neutral to build up and resonate, which is also objectionable.

It has heretofore been proposed to suppress such harmonic disturbances by the use of an auxiliary or so-called tertiary winding in addition to the regular primary and secondary windings. This tertiary for the three phases is connected in delta so that a short-circuited harmonic current may flow therein which is capable of bucking or neutralizing the harmonic disturbances produced in the regular windings.

In order that the tertiary may protect itself, it has been recognized that it must have high inductance with respect to the other windings, i. e. it must be loosely coupled magnetically with the regular windings.

I have discovered, however, that this practice in itself is not sufficient to remove effectually the harmonic disturbances.

In the practice of my invention I so locate the tertiary winding that it will have substantially the maximum effect in suppressing the harmonic disturbances. I locate it not only so as to have high inductance for purposes of self-protection, but also so as to neutralize as far as possible the harmonic components of the magnetomotive force in the core which induce the harmonic disturbances. This requires, in addition to loose coupling with the regular windings that there be close magnetic coupling with the core.

The location of the tertiary winding is therefore dependent upon the configuration of the primary and secondary windings about the core, as well as the shape and density of the different core sections.

In the ideal case therefore the core would be completely encased in a tertiary before the primary and secondary are applied in order to suppress completely the harmonic magnetomotive force component at every point; but practically suppression at points in the core of maximum flux density I have found to be sufficient.

For a complete understanding of the nature and objects of my invention reference should be had to the following detailed description taken in connection with the accompanying drawings in which:

Fig. 1 shows diagrammatically a single phase induction apparatus equipped with my invention. Fig. 2 shows in similar fashion a three-phase apparatus. Fig. 3 shows another apparatus in which the location of the tertiary is made to approach more nearly the ideal case than the arrangements shown in Figs. 1 and 2. Figs. 4, 5, 6, 7 and 8 are explanatory diagrams.

Referring now to the drawings, and to Fig. 1 in particular, C denotes a core of the shell type having windings on its central leg. The windings shown comprise groups A, B, A of high and low voltage coils arranged in interleaved fashion about the central leg; the groups being divided by barriers D of insulating material.

Between the groups of windings A, B, A, which in ordinary transformers constitute the regular primary and secondary windings and the core, is located the tertiary winding G in such a manner as to be closely coupled magnetically with the core; such tertiary being designed to suppress the harmonic component of the magnetomotive force in accordance with my invention.

This I accomplish in the following manner, since in cores of the shell type the windings are disposed about only the central leg, which as a rule carries the magnetic flux at maximum density and hence represents the locus of points of maximum flux density. The tertiary G accordingly is designed as indicated to envelop substantially completely the central leg; hence it envelops substantially all points in the core C where the harmonic components of the magnetomotive force have appreciable magnitude, and therefore has maximum suppressing effect on harmonic disturbances; the tertiary G at the same time being loosely coupled with the windings in groups A, B, A whereby sufficient space between the tertiary and the groups A, B, A, is provided to yield an ample path for the leakage flux therebetween, and sufficient inductance for self-protection.

In Fig. 2 I have indicated the mode of applying my invention in its approximate form to a three phase shell type transformer where C' denotes the core, each of the inside legs of which (the last two being broken away) carries a winding; such windings here again being denoted as of the interleaved type and composed of groups A, B, A separated by insulating barriers D.

Between each of the groups A, B, A on an inside leg and the core leg itself which they surround is interposed the tertiary winding, as $G_a$, $G_b$, etc. These inside legs again as before represent the loci of points of maximum flux density in the core, hence it is sufficient to have only the inside legs enshrouded respectively by the tertiaries $G_a$, $G_b$, etc., which are at the same time loosely coupled with the regular transformer windings.

In order however that my invention may more nearly approach the ideal form than the approximate forms heretofore described, I propose in some instances to locate the tertiary winding or windings as indicated in Fig. 3. Here again I have shown a three phase shell type transformer in which the core has substantially uniform cross-sectional area in all parts (indicated in the drawing by showing a core of substantially equal widths in all parts). The core is here denoted C'' having upper and lower yoke members H' and H''. The inside legs carry the regular windings, which as before are shown as composed of interleaved groups A, B, A separated by insulating barriers D. The tertiary here comprises a plurality of parts $g^1$, $g^2$, $g^3$, $g^4$, etc., arranged to envelop substantially all parts of the core. A part $g^1$ is shown as surrounding an inside leg but loosely coupled to the regular winding. Other parts as $g^2$ and $g^4$ envelop substantially the whole of the upper yoke H' while still other parts as $g^3$ and $g^6$ envelop substantially the whole of the lower yoke H''. The parts $g^1$, $g^2$, $g^3$, $g^4$, etc., of the tertiary would preferably be connected in series, assuming a series connection for the regular windings; but such connection is not essential as in general it will follow the connections employed for the regular windings. It is of course evident that the tertiary parts on the yokes, as $g^2$ and $g^3$, are loosely coupled magnetically with the winding groups A, B, A as well as the parts $g^1$, $g^5$, etc.

While I have shown interleaved disc-coils for the regular windings of the transformers illustrated, it is of course evident that I am not confined to such use, as concentric type cylindrical windings may be used equally well.

When transformers embodying my invention are connected to three phase systems of alternating current distribution the tertiary windings are connected delta whatever the connection of the regular windings. I have illustrated this in Fig. 4, where the winding groups $A_1$, $A_2$ and $A_3$ of the three phases are connected Y to the electric mains 11, 12 and 13 while the groups $B_1$, $B_2$ and $B_3$ for the same three phases are likewise connected Y to the feeders 21, 22 and 23. The tertiaries $G_1$, $G_2$ and $G_3$ are however shown connected delta. This use of tertiaries in accordance with my invention will suppress the harmonic component of the magnetomotive force which would otherwise induce triple harmonic voltages or cause third harmonic current to flow from the neutral to ground at 30 or through the neutral of other connected apparatus.

It is thus seen that my invention may be employed to suppress substantially harmonic disturbances in stationary induction apparatus whatever the kind or arrangenment of windings employed by properly applying a tertiary winding.

That the suppression of the harmonic component of the magnetomotive force effectually removes the cause of harmonic disturbances will be readily understood from the following considerations taken in connection with the diagrams in Figs. 5, 6, 7 and 8.

Fig. 5 indicates the relation between the flux produced and the magnetomotive force producing it; the curve showing the well-known hysteresis loop. The magnetomotive force is represented by abscissæ along OH, the flux produced being represented by corresponding ordinates parallel to OB. Hence, where there is a sinusoidal flux produced, as indicated by the curve at $\varphi$ in Fig. 6, the magnetomotive force producing it is clearly not sinusoidal. Accordingly the magnetizing current producing the magnetomotive force cannot be sinusoidal, but is represented by the irregular curve $I\mu$ in Fig. 6.

By harmonic analysis however the curve $I\mu$ may be resolved into its harmonic components, chief of which are the pure sine curve $I_f$ of the same frequency as the curve $I\mu$ or fundamental frequency and the curve $I_t$ of a frequency three times that of the fundamental. This curve, of course, represents the third harmonic component of the magnetizing current.

These curves enable us to resolve the magnetizing current at any instant into its harmonic components. Take for example, that value corresponding to point $P_o$. Its components are obtained by drawing in the ordinates, hence by drawing ordinate $P_{ox}$ we have the valves of the components represented by $P_1$ on the fundamental curve and $P_3$ on the third harmonic curve, which values may be regarded as the projections on the ordinates of the rotating vectors $I_f$ and $I_t$ drawn at the right in Fig. 7; the the vector $I_t$ rotating three times as fast as that at $I_f$.

Figure 8:
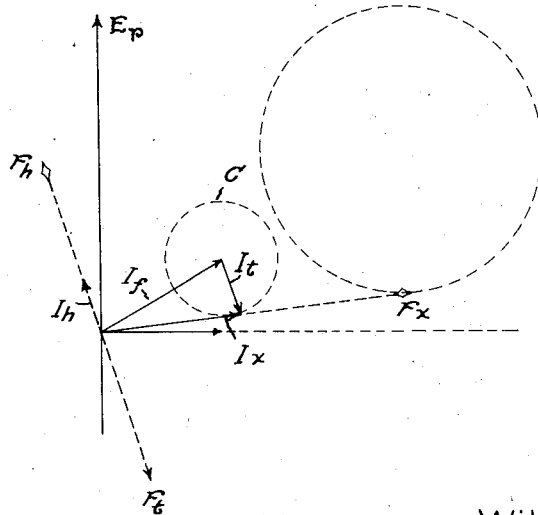

The relations of the resulting magnetomotive forces to these current vectors are depicted in vector symbols in Fig. 8. Here the rotating vectors $I_t$ and $I_f$ are maximum values, whose projections correspond to some instantaneous values of the harmonic components of the magnetizing current; the vector $I_f$ rotating synchronously with the impressed E. M. F. vector denoted $E_p$, while the vector $I_t$ rotates three times as fast, describing a circle indicated at C with respect to $I_f$ three times in one cycle. The resultant vector $I_x$ whose perturbations are thus depicted by the circle C, has projections which correspond to the instantaneous values of the exciting current which magnetizes the core. The magnetomotive forces corresponding to these current vectors would be in phase with each of them and are denoted $F_t$ and $F_x$ respectively, $F_x$ denoting the vector whose projection gives the instantaneous value of the magnetomotive force producing the sinusoidal flux in the transformer core.

If we now draw $I_h$ and $F_h$ equal and opposite to the vectors $I_t$ and $F_t$ respectively, we have vectors whose projections give the instantaneous current circulating in the tertiary winding and the corresponding magnetomotive force which it would generate in the core when the tertiary is closely coupled thereto.

In the practice of my invention, the magnetomotive force $F_h$ is impressed upon the core carrying the magnetizing magnetic flux and is given a magnitude calculated to suppress the magnetomotive force component $F_t$ which is otherwise always present in the core to induce harmonic disturbances in the regular transformer windings of three phase transformers.

Having now described what is at present the best means known to me for carrying out an embodiment of my invention, I would have it understood that such means are merely illustrative and that I do not mean to be limited thereby to the precise details shown nor restricted in the choice of recognized equivalents except as defined in my claims hereunto appended.

What I claim as new and desire to secure by Letters Patent of the United States, is:

1. In polyphase stationary induction apparatus, the combination with a magnetic core, of electrical windings thereon arranged in inductive relation to each other, and another independent winding thereon disposed in close inductive relation to the core and in loose inductive relation to the first mentioned windings.

2. In polyphase stationary induction apparatus, the combination with a magnetic core, of electrical windings thereon arranged in inductive relation to each other, and another independent winding thereon enveloping portions of the core having maximum flux density and loosely coupled magnetically with the first mentioned windings.

3. In stationary induction apparatus adapted for operation in three phase systems, the combination with a magentic core, of electrical windings disposed thereon in inductive relation to each other, and an auxiliary winding adapted to suppress harmonic disturbance disposed in close inductive relation with the core and in poor inductive relation with the first mentioned windings.

4. In stationary induction apparatus adapted for operation in three phase systems, the combination with a magnetic core, of electrical windings disposed thereon in inductive relation to each other, and an auxiliary winding adapted to suppress harmonic disturbances, auxiliary winding being disposed to envelop portions of the core having maximum flux density and loosely coupled magnetically with the first mentioned windings.

5. A transformer adapted for operation in three phase systems, comprising in combination a magnetic core having a winding leg, primary and secondary windings disposed in spaced relation to said winding leg and in inductive relation to said core and to each other, and a tertiary winding interposed between the first mentioned windings and said leg, the same being closely coupled magnetically with said core and loosely coupled magnetically with the first mentioned windings.

6. A transformer adapted for operation in three phase systems, comprising in combination a magnetic core having a winding leg, primary and secondary windings disposed in spaced relation to said winding leg and in inductive relation to said core and to each other, and a tertiary winding enveloping the said leg and those portions of the core having maximum magnetic flux density, said windings being disposed on said core relatively to have loose coupling magnetically between the tertiary and the first mentioned windings.

In witness whereof, I have hereunto set my hand this 24th day of Jan., 1921.

WILLIAM O. DWYER.